US010460401B2

(12) United States Patent
Jones et al.

(10) Patent No.: US 10,460,401 B2
(45) Date of Patent: Oct. 29, 2019

(54) SYSTEMS, METHODS, AND APPARATUS FOR EVENT PLANNING

(71) Applicant: FACEBOOK, INC., Menlo Park, CA (US)

(72) Inventors: Christopher William Jones, Mill Valley, CA (US); Adam Scott Berger, New York, NY (US); Keenan Pridmore, Chicago, IL (US)

(73) Assignee: Facebook, Inc., Menlo Park, CA (US)

( * ) Notice: Subject to any disclaimer, the term of this patent is extended or adjusted under 35 U.S.C. 154(b) by 667 days.

(21) Appl. No.: 14/972,599

(22) Filed: Dec. 17, 2015

(65) Prior Publication Data
US 2017/0178251 A1    Jun. 22, 2017

(51) Int. Cl.
    *G06Q 50/00* (2012.01)
    *G06Q 10/10* (2012.01)

(52) U.S. Cl.
    CPC ......... *G06Q 50/01* (2013.01); *G06Q 10/1095* (2013.01)

(58) Field of Classification Search
    USPC .............................................. 705/7.11–7.42
    See application file for complete search history.

(56) References Cited

U.S. PATENT DOCUMENTS

| | | | | |
|---|---|---|---|---|
| 7,548,915 | B2 * | 6/2009 | Ramer | G06Q 30/0243 705/14.54 |
| 2003/0233278 | A1 * | 12/2003 | Marshall | G06Q 30/00 705/14.35 |
| 2014/0052485 | A1 * | 2/2014 | Shidfar | G06Q 10/06311 705/7.13 |
| 2014/0310046 | A1 * | 10/2014 | Shidfar | G06Q 10/1095 705/7.19 |
| 2015/0262219 | A1 * | 9/2015 | Vock | G06Q 30/0242 705/14.41 |

OTHER PUBLICATIONS

Becker, et al., "Learning Similarity Metrics for Event Identification in Social Media", WSDM '10, New York City, NY 2010 (Year: 2010).*

* cited by examiner

*Primary Examiner* — Amber A Misiaszek
(74) *Attorney, Agent, or Firm* — Keller Jolley Preece

(57) ABSTRACT

Exemplary methods, apparatuses, and systems for event planning and management are detailed. In some embodiments, a method includes receiving a plurality of selectable actions and associated media element content for an event, generating a media event comprising one or more of the received media elements, and transmitting the media event to an event recipient on a date of the event.

20 Claims, 17 Drawing Sheets

```
┌─────────────────────────┐
│       STATUS 821        │
├─────────────────────────┤
│                         │
│                         │
│                         │
│                         │
│                         │
│┌───────────────────────┐│
││ PARTY CODE ____  801  ││
│└───────────────────────┘│
│                         │
│                         │
│                         │
│                         │
└─────────────────────────┘
```

FIG. 8

SYSTEMS, METHODS, AND APPARATUS FOR EVENT PLANNING

FIELD

The various embodiments described herein relate to event planning and management.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Exemplary methods, apparatuses, and systems for event planning and management.

In one embodiment, a plurality of selectable actions and associated media element content for an event are received. For example, actions such as recording a media element, uploading a media element, inputting text, or inviting a person. A media event comprising one or more of the received media elements is generated and transmitted to an event recipient on a date of the event. For example, a media event of a collection of people saying happy birthday is generated from user submissions and sent to the birthday user.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIGS. 3-9 illustrate graphical user interfaces (GUIs) for event planning and participation;

DETAILED DESCRIPTION

Social networking systems benefit from techniques that improve an ability of users to share online content with other users of the social networking system. Detailed below is an approach to creating surprise events for recipients that may include media elements.

In the following description, numerous specific details are set forth. However, it is understood that embodiments of the invention may be practiced without these specific details. While a social networking system is used to describe embodiments of preview generation for online content, it will be understood that these concepts are generally applicable to generating previews for online content for other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
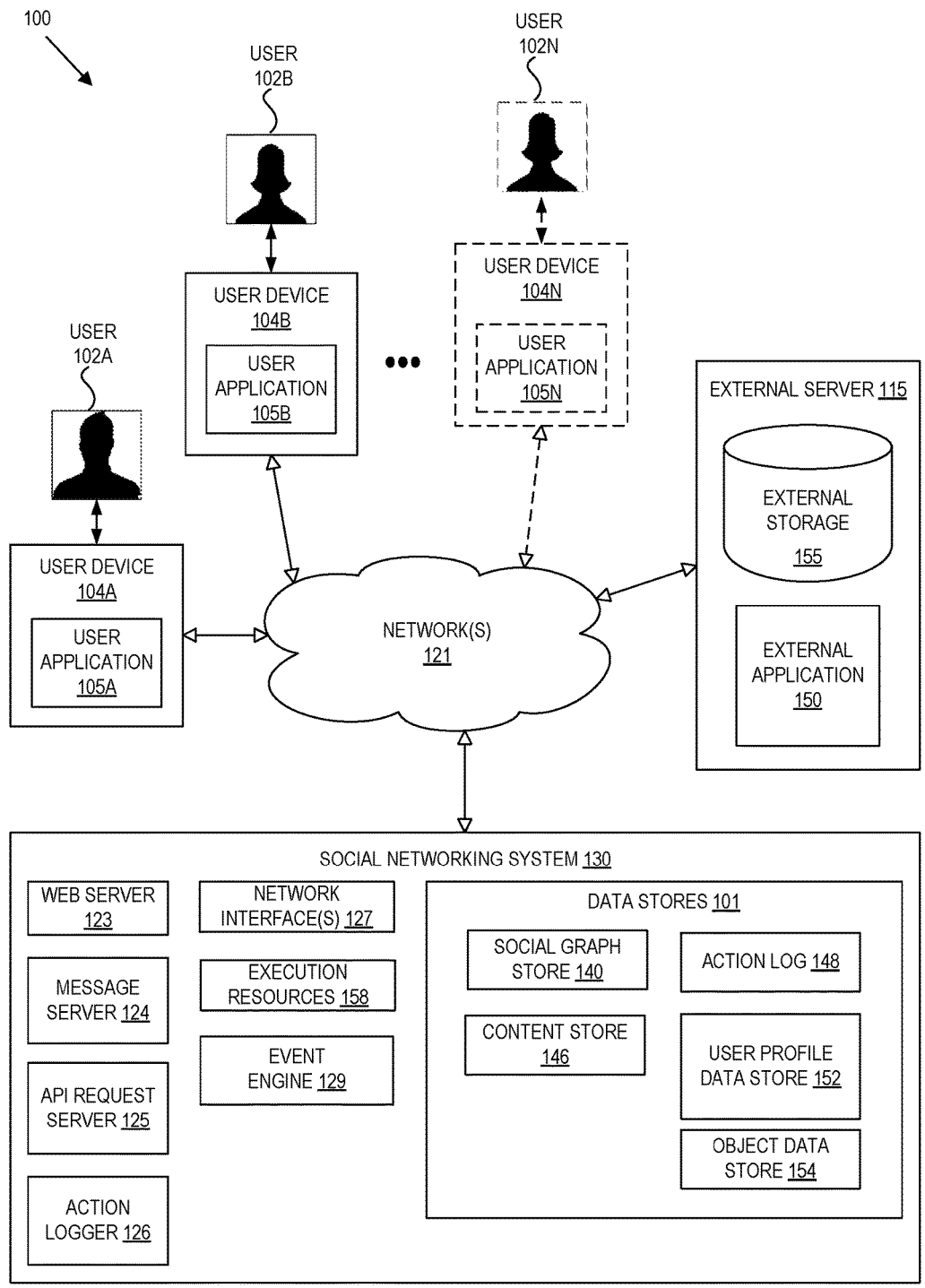
FIG. 1 illustrates an example network environment of a system including a social networking system.

FIG. 1 illustrates an example network environment of a system 100 including a social networking system 130 that offers its users 102A-102N the ability to communicate and interact with other users 102A-102N and entities of the social networking system 130 according to an embodiment of the invention. The illustrated social networking system 130 includes a content creator identification analysis module 129 for automatically identifying content creators from resources shared between users of the social networking system in accordance with an embodiment of the invention.

In some embodiments, the social networking system 130 comprises one or more computing devices storing user profiles associated with users 102A-102N and/or other objects, as well as connections between users and other users 102A-102N and/or objects.

The user devices 104A-104N that are enabled to interact with social networking system 130 can be any type of computing device capable of receiving user input as well as transmitting and/or receiving data via a network (e.g., network 121). For example, the user devices 104A-104N can include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native operating system of the user device 104A, such as Windows®, Mac OSX®, IOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115 (e.g., server end stations).

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and an edge store 144, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued 'messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a wall post. In some embodiments, a user can send a private message to another user that can only be retrieved by the other user. These messages are stored in storage such as message store 1

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction.

Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as posts, images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, the social networking system 130 includes event engine 129 to be executed on a processor of the social networking system 130. The event engine 129 performs one or more functions for providing relational capabilities of the social networking system 130. For example, the event engine 129 performs one or more of: 1) receiving media content for inclusion in a presentation (event) for a user; 2) generating a media event of received content (if appropriate); and 3) transmitting the event to the user and those that participated in the event. Of course, this functionality may be spread across multiple engines.

Figure 2:
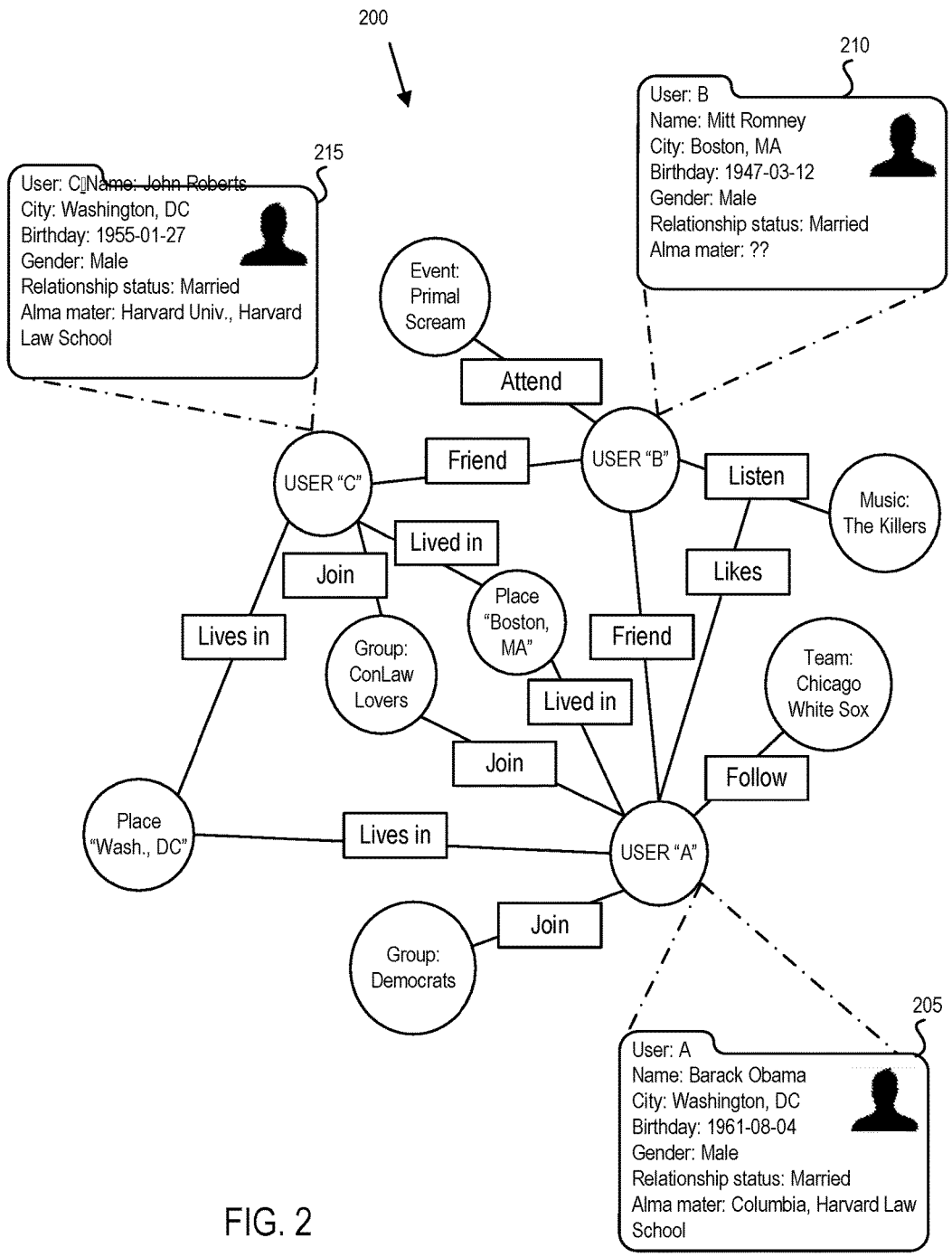
FIG. 2 illustrates exemplary graph of social network data.

FIG. 2 illustrates an exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, users may select privacy settings to control what network service data is shared, with whom the data is shared, and/or what data used for selecting candidate objects.

FIGS. 3-9 illustrate embodiments of graphical user interfaces (GUIs) for event planning and participation. While these figures illustrate a standalone application (such as a smartphone or tablet application), in some embodiments, the representative content shown in these figures is provided via a browser interface (mobile or desktop). When an application is run on a device, many of the fields detailed herein are provided by the application itself. However, content for one or more of the fields may be provided by a service such as a social networking service. Moreover, the content of the GUIs may be consolidated into fewer GUIs or expanded to use more GUIs depending upon the embodiment. Additionally, while the figures and GUIs are shown in a particular order, one or more of the GUIs may be presented to a user in a different order (or not at all) depending upon the embodiment.

Figure 3:
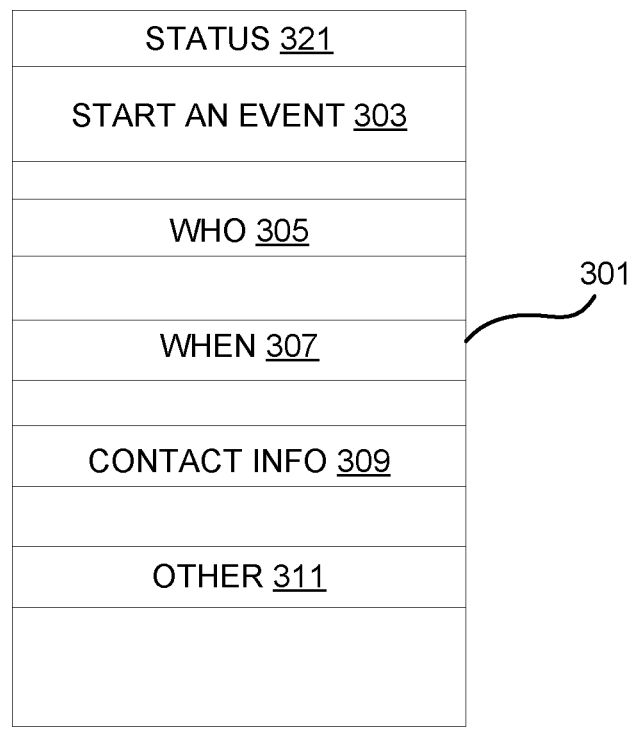

FIG. 3 illustrates an embodiment of a graphical user interface (GUI) for an event planning and/or viewing application. In this exemplary embodiment, the GUI 301 is one of the first screens that a user will be presented with when that user is attempting to establish an event. The GUI 301 may be referred to as an event information GUI. The event information fields of this GUI 301 prompt and allow a user to provide information about an event such as who the event is for (who field 305), when the event is to take place (when field 307), contact information for the event recipient (contact info field 309), and a field for other information 311 such as how old the event recipient will be, etc. Typically, these fields are fillable, however, in some embodiments, either the application itself, or the service it communicates with, suggests one or more of the contents of the event information fields. For example, a suggestion of when a person's birthday once the who filed 305 and that person's contact information may be automatically populated if known by either the application or service.

In some embodiments, a type of event field 313 is provided. Exemplary type of events included, but are not limited, birthdays, anniversaries, retirement, birth of a child, graduations, 21$^{st}$ birthday, etc. This field allows the GUI 301 to be tailored to the event such that the text of what to put into the above described fields to prompt the user to enter information are event specific.

In most embodiments of the described GUIs of the following figures, a status field 321 is provided. Typically, the status field 321 provides an indication of what the GUI is about and/or a means for proceeding to the next or previous screen. In the illustration of FIG. 3, the status field 321 normally includes text indicating that this a beginning of the event planning process. For example, text such as "Start an Event" is displayed. Additionally, a navigation means to move to a different GUI (such as a "Next" or "Previous" button or link) are provided in this field. In some embodiments, this navigation means is provided in a different are of the GUI. Additionally, the movement to a different GUI saves input in the fields of the GUIs. The description of this field will not be repeated for subsequent figures, but the status field in those figures has a similar number to readily identify it.

Figure 4:
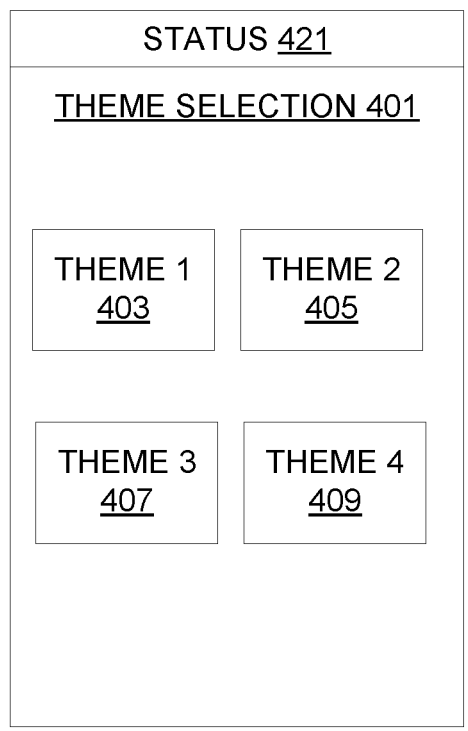

FIG. 4 illustrates an embodiment of a graphical user interface (GUI) for an event planning and/or viewing application. In this embodiment, a theme selection GUI 401 is provided. For example, a user may select one of a plurality of themes (themes 1-4 403-09) to apply to the event. In some embodiments, the themes are tied to a particular event such as birthday, retirement party, a holiday, etc.

In some embodiments, the selectable themes 403-09 are tied to a particular entity. For example, the selectable themes may each be a different character of a movie or television show. These themes could therefore serve as an advertising platform for an entity.

In some embodiments, one or more of the selectable themes 403-09 are tied to the recipient. Using a profile of the recipient (such as one stored at a social networking service) the selectable themes 403-09 are tailored to the preferences of that recipient. This tailoring may be done by the application or a backend provided by the service that the application communicates with. For example, if the recipient has a particular favorite sports team, selectable themes related to players of that team, etc. may be provided.

Figure 5:

FIG. 5 illustrates an embodiment of a graphical user interface (GUI) for an event planning and/or viewing application. In this embodiment, a selectable action GUI 501 for the event is provided. In most embodiments, an event includes one or more of media (such as images or video) or text to the recipient. For example, a happy birthday event may include several people singing happy birthday to the recipient. The selectable actions GUI 501 may include one or more actions to allow a user to record a media element 503 (take a picture, or record video and/or audio), upload a media element 505 (submit an existing picture, or video and/or audio), write text 507, and/or invite others to the event 509. In some embodiments, only a subset of these actions are available to the user.

Figure 6:
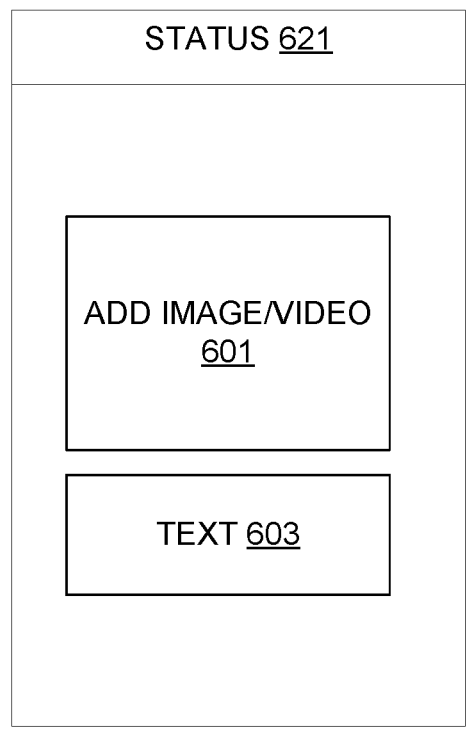

FIG. 6 illustrates an embodiment of a graphical user interface (GUI) for an event planning and/or viewing application. In this GUI, a user may add a media element using field 601 and/or text 603 to the event. Typically, this GUI is provided after a user has selected an action in a previous GUI. Submitted media elements and/or text may be added to the event as will be detailed below. In most embodiments, the backend service (such as a social network) stores content of the event including media elements, however, in other embodiments, media elements are stored within the application of the user that initiated the event.

Figure 7:

FIG. 7 illustrates an embodiment of a graphical user interface (GUI) for an event planning and/or viewing application. In this GUI, a user may invite others to the event. The invitation may be sent from the application, the user's social networking page, the user's email or text service, etc. An invitee's name may be placed into field 701 and contact information may be placed into field 703. If the application or service backend knows the invitee's contact information that may be placed in the field 701 for the user. Additionally, in some embodiments, a check is performed against the contact information of FIG. 3 to ensure that the recipient of the event is not notified and the event is kept a surprise. An invite typically includes a link to, or a code for, the event and a brief description of the event.

Figure 8:
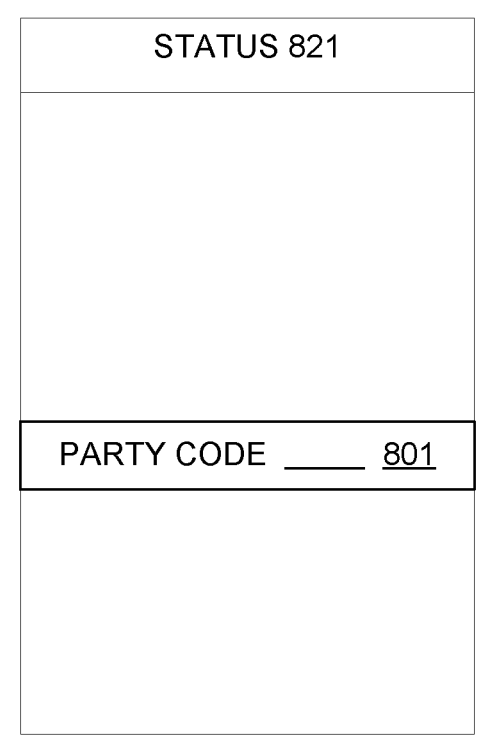

FIG. 8 illustrates an embodiment of a graphical user interface (GUI) for an event planning and/or viewing application. In this GUI, an invitee may input an event code into field 801. Upon entering the code, the user is typically taken to the selectable action GUI detailed above.

Figure 9:
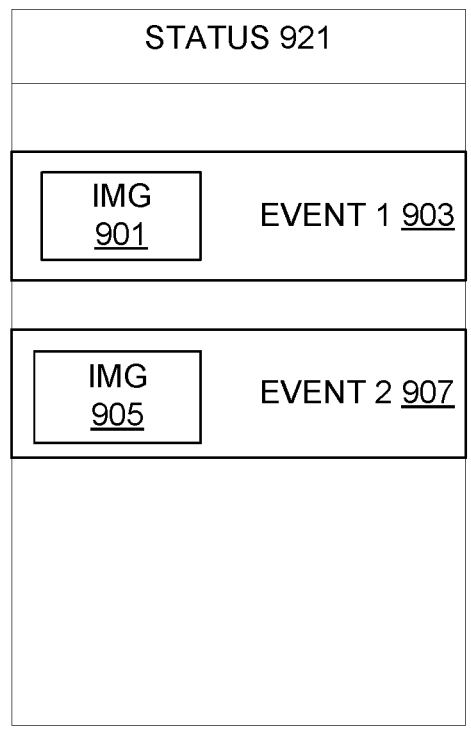

FIG. 9 illustrates an embodiment of a graphical user interface (GUI) for an event planning and/or viewing application. This GUI illustrates events 903, 907 that are available to the user. These events may be events that the user is participating in, but not the recipient, or events that the user is a recipient of. In some embodiments, the type of event (participant or recipient) is identified by a distinguishing mark such as color, placement in the GUI, etc.

Available events may also include an image 901, 905. For example, a picture from the event may be shown or an aspect of the them may be shown.

Figure 10:
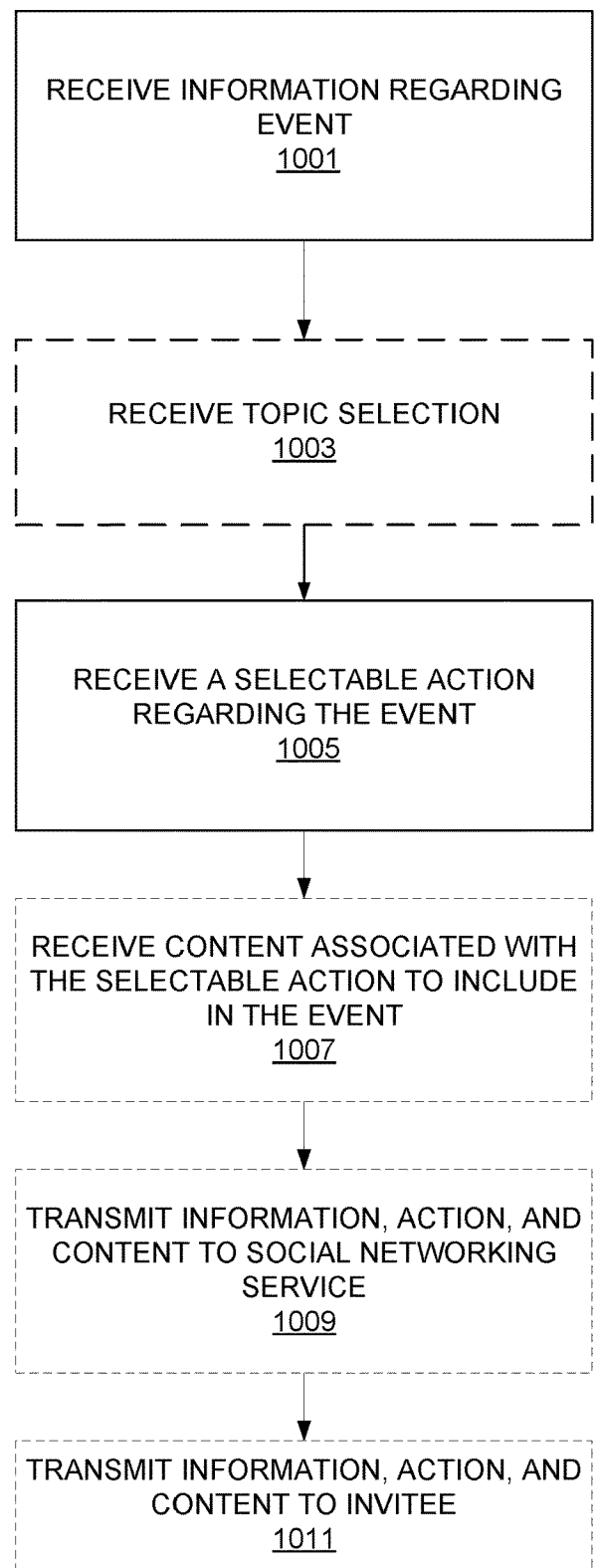
FIG. 10 illustrates an embodiment of method for providing event planning through a plurality of GUIs.

FIG. 10 illustrates an embodiment of method for providing event planning through a plurality of GUIs. This method may be performed by a standalone application executing on a computer, or by a backend server providing a plurality of GUIs to a user.

At 1001, information regarding an event is received. For example, information from the GUI of FIG. 3 is received via an application. This information is typically only received once from the event initiator.

In some embodiments a topic selection is received at 1003. For example, a topic selection from the GUI of FIG. 4 is received. This information is typically only received once from the event initiator. In some embodiments, topics are sponsored.

A selectable action regarding the event is received at 1005 such as via the GUI of FIG. 6. Selectable actions include, but are not limited to, allowing a user to record a media element, an upload of a media element, input text, and an invitation to another.

Content associated with the selectable action (such as a media element or text) is received at 1007. In most instances, this content will be included in the event. However, in some embodiments, content that is deemed unacceptable will not be included. For example, in a sponsored event, content supporting a competitor may be excluded. Additionally, content that is not germane to the event may be excluded. For example, images of a graphic or adult nature are typically excluded. In some embodiments, content to be excluded is dependent upon the recipient's preferences that are known from the recipient's profile.

In some embodiments, information about the event, the selected action, and content are transmitted to the social networking service at 1009. This may have also occurred at previously steps within the method and not be necessary at 1009. Received content from a plurality of users is used to create a media event as discussed below.

In some embodiments, information about the event is sent to an invitee as an invite 1011. As detailed above, the invite may come from the application, service, or the inviter's email or text account. Additionally, in some embodiments, previously submitted content is provided to the invitee at 1011.

Figure 11:
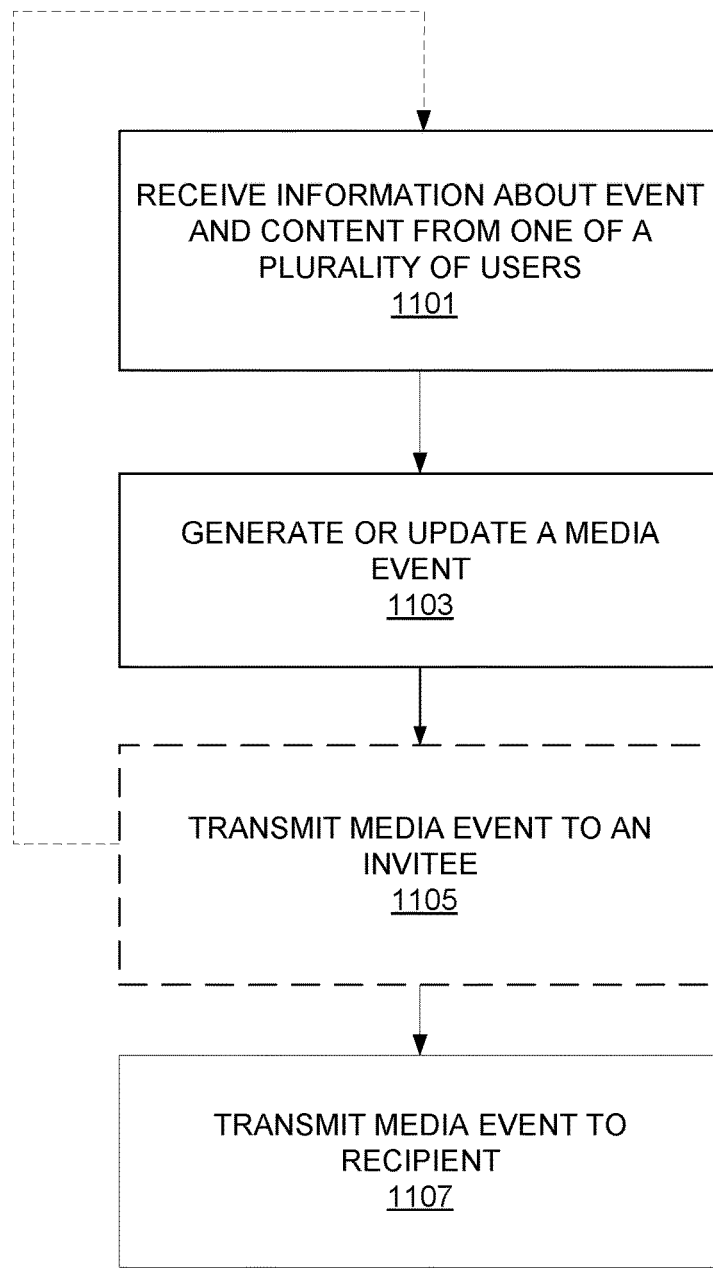
FIG. 11 illustrates an embodiment of method for providing event planning through a plurality of GUIs.

FIG. 11 illustrates an embodiment of method for providing event planning through a plurality of GUIs. This method may be performed by a standalone application executing on a computer, or by a backend server providing a plurality of GUIs to a user.

At 1101, information and media element content regarding an event associated with a selectable action is received. For example, information from the GUI of FIG. 3 is received via an application.

A media event comprising one or more media elements and/or text is generated or updated at 1103. For example, a collection of videos is processed to form a single video. Received text may also be included in the media event. If no videos are received, audio may be added to received text (such as a collection of users singing happy birthday or the recipients favorite song, etc.). In some embodiments, the user that initiated the event may edit the media event.

In some embodiments, the media event is transmitted to an invitee at 1105. This transmission allows an invitee to see what has already been added to the event prior to his/her submission.

At 1107, the media event is transmitted to the recipient. This transmission occurs on the date of the event.

Figure 12:
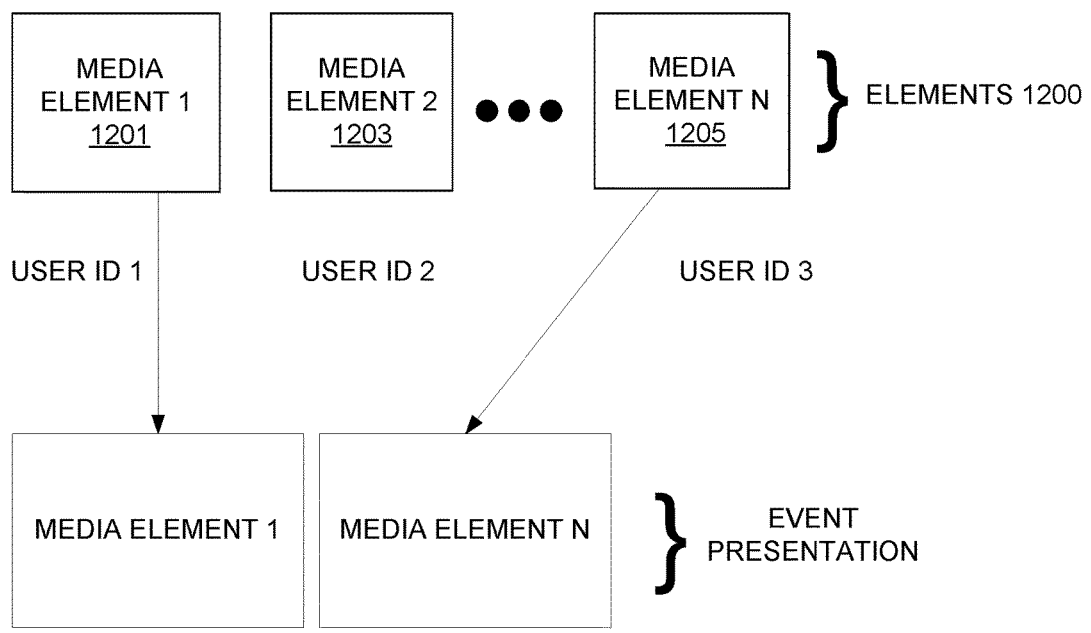
FIG. 12 illustrates an example of media element selection.

FIG. 12 illustrates an example of media element selection. In this illustration, there are N media elements 1201-N that have been submitted by various users (user ID 1–N) for the event. In this example, media element 2 1203 is not included in the media event. This media element 2 1203 may have been deemed by the social networking service or initiator to be inappropriate for the event. In some embodiments, the social networking service also checks submitted media elements for copyright violations.

Figure 13:
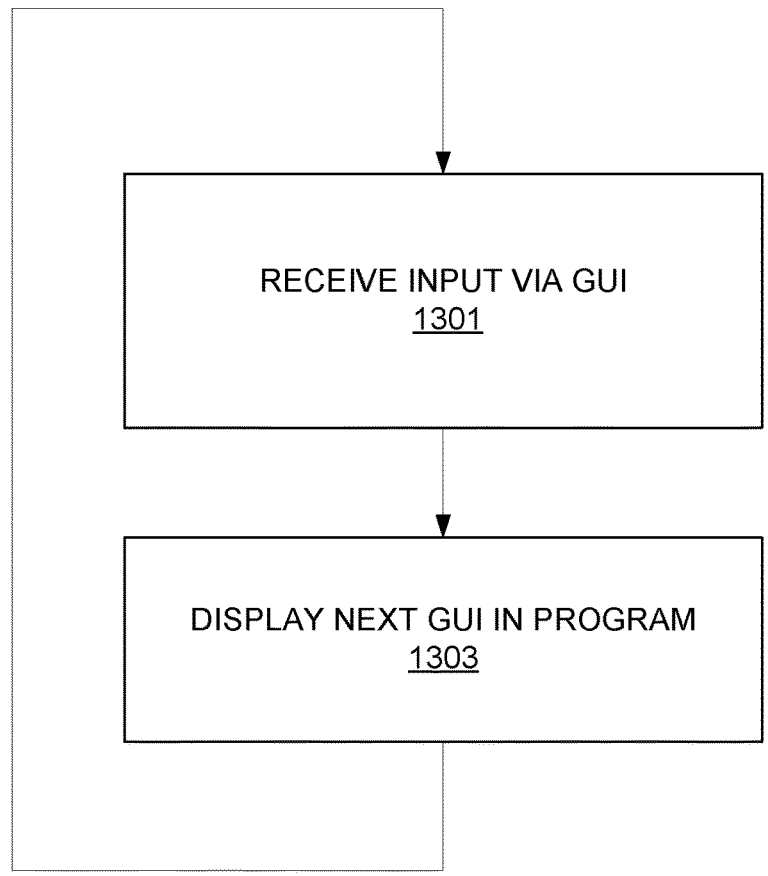
FIG. 13 illustrates an embodiment of an application flow for event generation.

FIG. 13 illustrates an embodiment of an application flow for event generation. At 1301, input is received from a user. The next GUI in the application is displayed at 1303. This continues until the user has progressed through GUIs regarding the event.

Figure 14:
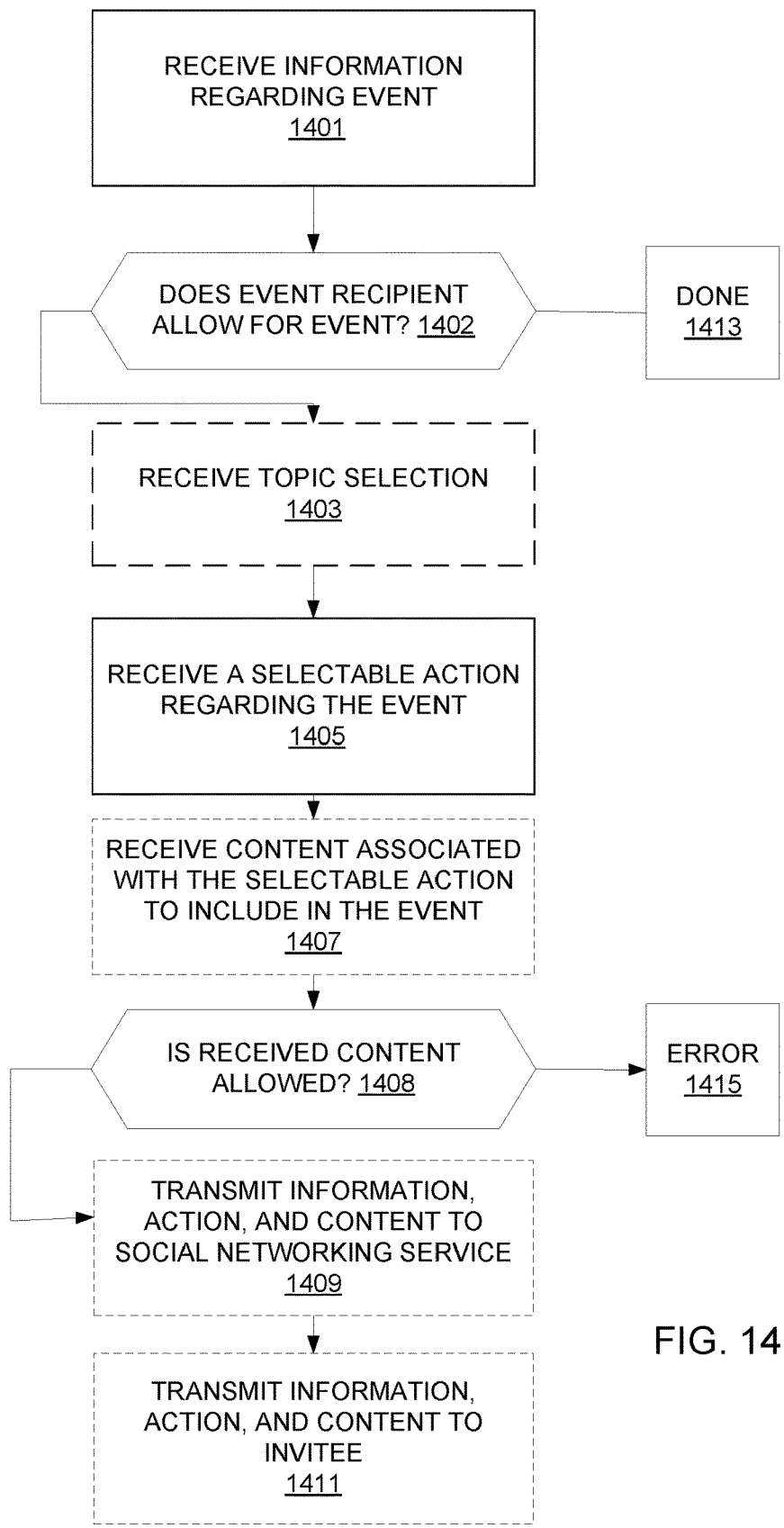
FIG. 14 illustrates an embodiment of a method for processing event content.

FIG. 14 illustrates an embodiment of a method for processing event content. In most embodiments, this is performed by the social networking system. At 1401, information regarding an event is received. For example, information from the GUI of FIG. 3 is received via an application. This information is typically only received once from the event initiator.

At 1402, a determination of if an event recipient allows for the event is made. For example, does the recipient's privacy settings allow for such an event? If not, then the event is not held at 1413.

In some embodiments a topic selection is received at 1403. For example, a topic selection from the GUI of FIG. 4 is received. This information is typically only received once from the event initiator.

A selectable action regarding the event is received at 1405 such as via the GUI of FIG. 6.

Content associated with the selectable action (such as a media element or text) is received at 1407. In most instances, this content will be included in the event. However, in some embodiments, content that is deemed unacceptable will not be included. For example, in a sponsored event, content supporting a competitor may be excluded. Additionally, content that is not germane to the event may be excluded. For example, images of a graphic or adult nature are typically excluded. In some embodiments, content to be excluded is dependent upon the recipient's preferences that are known from the recipient's profile.

At 1408, a determination of if the content is allowed is made. For example, does the recipient's privacy settings allow for the content? Or, in a sponsored event, does the sponsor allow the content? Or, is the content allowed by the social networking system? If not, then the content is not included and an error occurs at 1415.

In some embodiments, information about the event, the selected action, and content are transmitted to the social networking service at 1409 when the content is allowed. This may have also occurred at previously steps within the method and not be necessary at 1409.

In some embodiments, information about the event is sent to an invitee as an invite 1411. As detailed above, the invite may come from the application, service, or the inviter's email or text account. Additionally, in some embodiments, previously submitted content is provided to the invitee at 1411.

Figure 15:
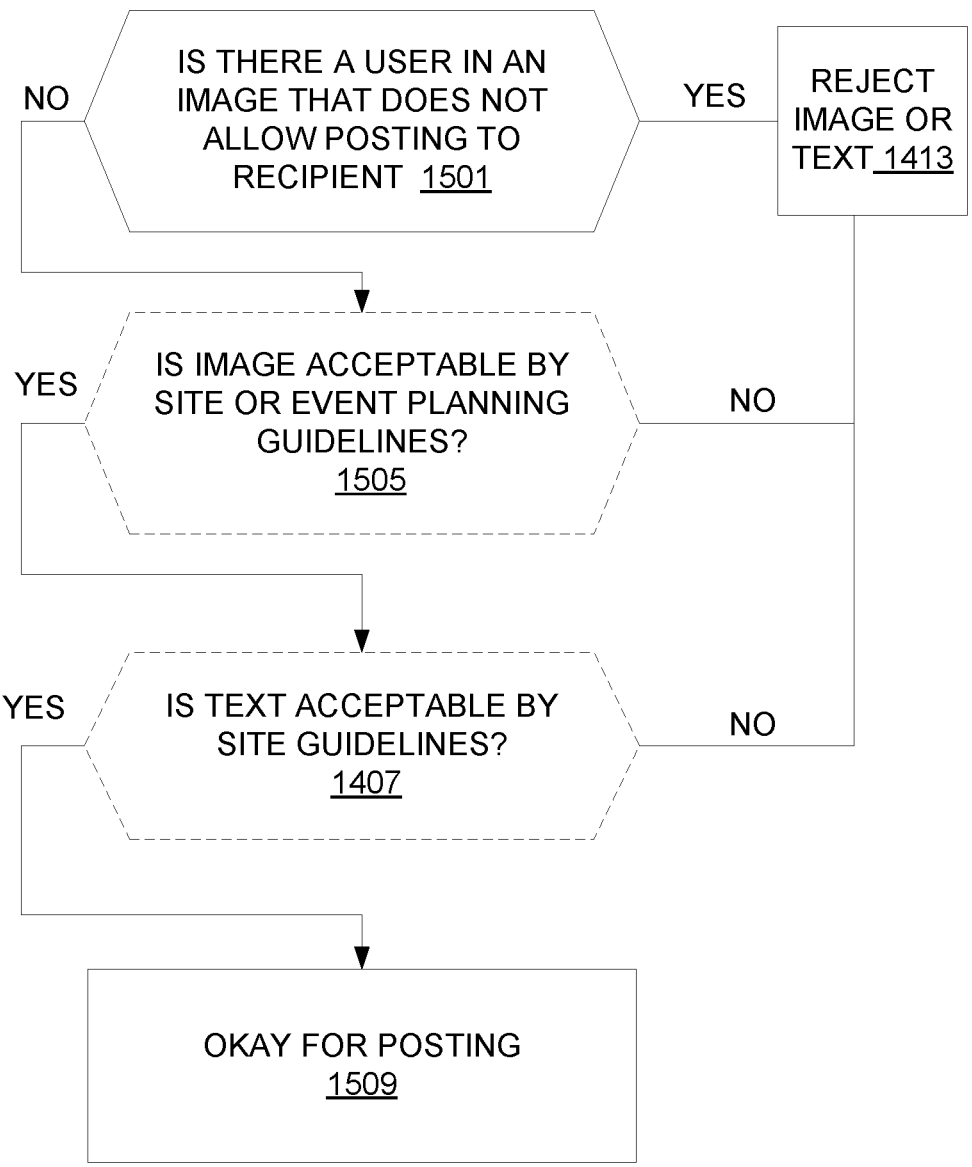
FIG. 15 illustrates an embodiment of a method for determining if a media element is acceptable for posting (inclusion) in a media event.

FIG. 15 illustrates an embodiment of a method for determining if a media element is acceptable for posting (inclusion) in a media event. This method may be performed by a standalone application executing on a computer, or by a backend server.

At 1501, a determination of if there is a user in the received media element (image—still or video) that does not allow posting to the recipient is made. In some embodiments, facial recognition in an image is performed and the results of that recognition are compared to the profile of the social networking service to determine if the media element contains a user that does not allow the recipient to see him/her. In other embodiments, metadata associated with the image is similarly evaluated.

When there is such a user, the image is rejected at 1513 and will not be included in the media event.

When there is not such a user, in some embodiments, a determination is made of if the image is acceptable by the site or event planning guidelines at 1505. For example, for a sponsored event, a determination of if the content includes derogatory comments about the sponsor may be made, etc. Another example of potential unacceptability is when an image contains adult content such as nudity or drug use.

When there is such content, the image is rejected at 1513 and will not be included in the media event.

When there is not such a user, in some embodiments, a determination is made of received text is acceptable by the site or event planning guidelines at 1507. For example, for a sponsored event, a determination of if the text includes derogatory comments about the sponsor may be made, etc. Another example of potential unacceptability is when text contains adult language.

When there is such content, the image is rejected at 1513 and will not be included in the media event.

Acceptable content (image or text) is deemed okay for posting and inclusion into a media event at 1509.

Figure 16:
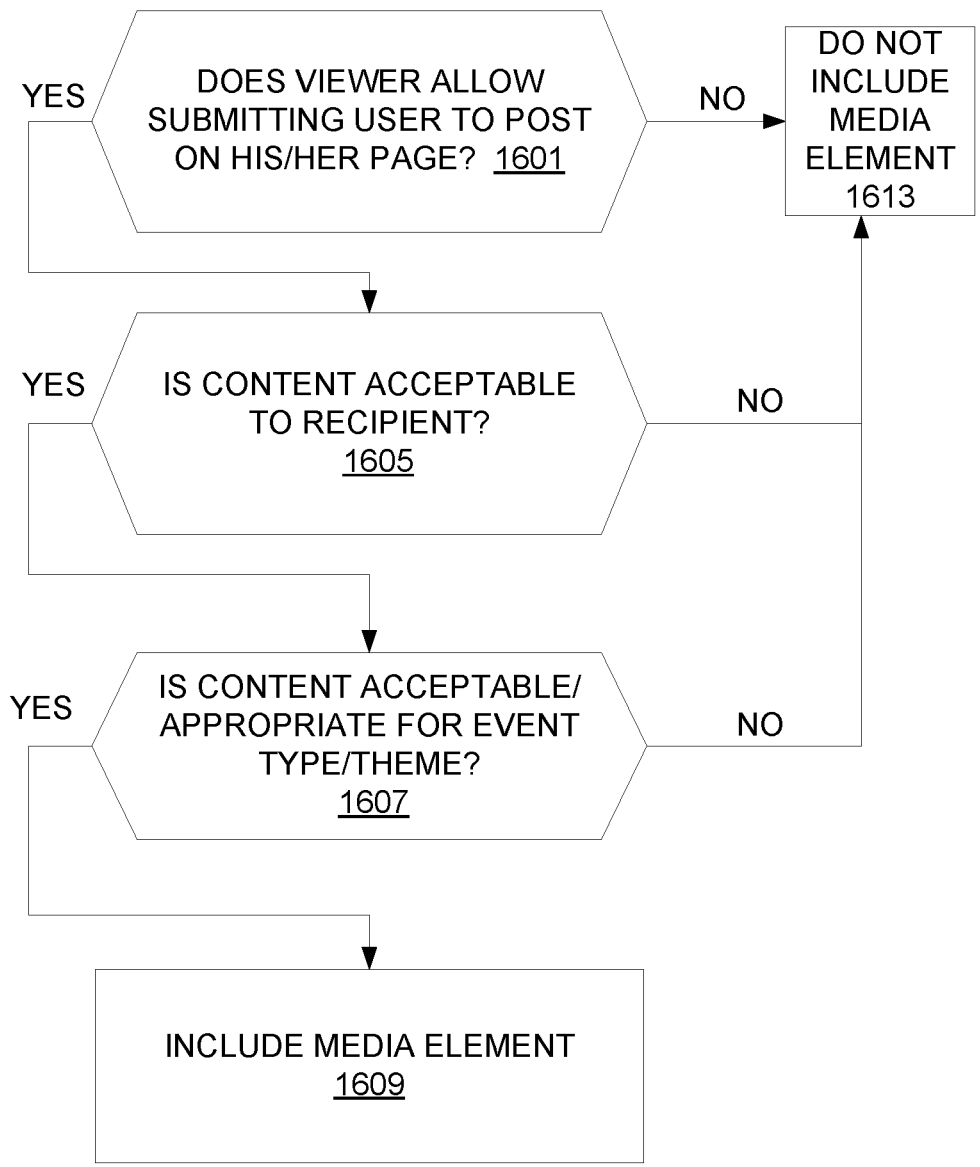
FIG. 16 illustrates an embodiment of a method for determining if a media element is to be included in a media event for a user.

FIG. 16 illustrates an embodiment of a method for determining if a media element is to be included in a media event for a user. This method may be performed by a standalone application executing on a computer, or by a backend server.

At 1601, a determination of if the viewer (user that may not be the recipient of the event) allows submitting user to post on his/her page is made. If not, then the media element is not included at 1613.

When the viewer allows for submitting, a determination is made of if the content is acceptable to the recipient is made at 1605. For example, is the content of a type that the recipient would not approve of (such as drinking for an underage recipient).

When there is such content, the image is rejected at 1613 and will not be included in the media event.

When there is not such a user, in some embodiments, a determination is made of if the content is acceptable for the event type/theme at 1607. For example, for a sponsored event, a determination of if the text includes derogatory comments about the sponsor may be made, etc. Another example of potential unacceptability is when text contains adult language.

When the content is unacceptable, the media element is rejected at 1613 and will not be included in the media event. Acceptable content (image or text) is deemed okay for posting and inclusion into a media event at 1609.

Figure 17:
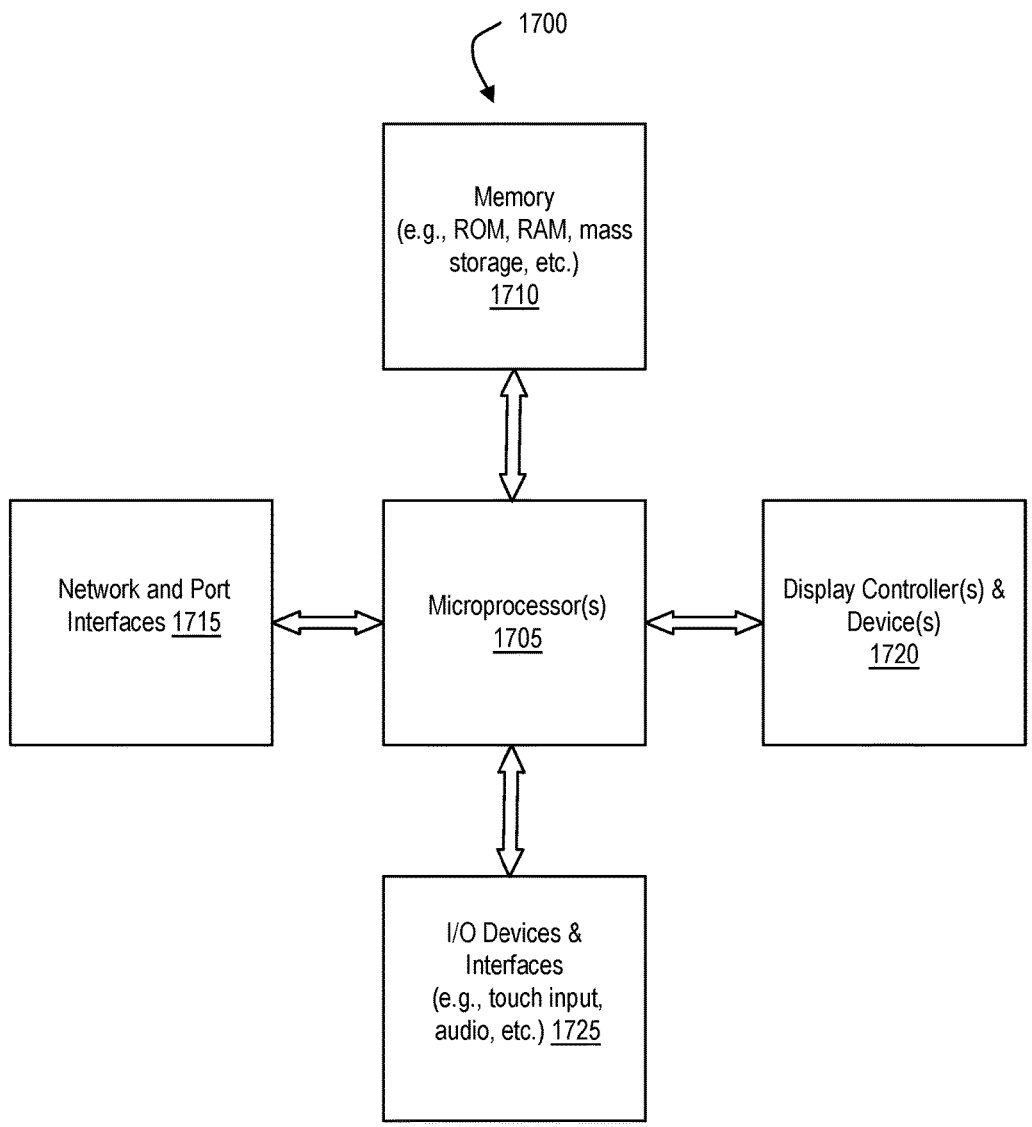
FIG. 17 illustrates, in block diagram form, an exemplary processing system to perform methods detailed herein.

FIG. 17 illustrates, in block diagram form, an exemplary processing system to perform event planning and events as detailed herein. In some embodiments, this is a high-level view of social networking system 1130 described herein. Data processing system 1700 includes one or more microprocessors 1705 and connected system components (e.g., multiple connected chips). Alternatively, data processing system 1700 is a system on a chip.

Data processing system 1700 includes memory 1710, which is coupled to microprocessor(s) 1705. Memory 1710 may be used for storing data, metadata, and programs for execution by the microprocessor(s) 1705 including the modules and engines detailed above. For example, memory 1710 may include one or more of the data stores 101 and/or may store modules described herein. Memory 1710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1710 may be internal or distributed memory.

Data processing system 1700 includes network and port interfaces 1715, such as a port, connector for a dock, or a connector for a USB interface, FireWire, Thunderbolt, Ethernet, Fibre Channel, etc. to connect the system 1700 with another device, external component, or a network. Exemplary network and port interfaces 1715 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1700 with another device, external component, or a network and receive stored instructions, data, tokens, etc.

Data processing system 1700 also includes display controller and display device 1720 and one or more input or output ("I/O") devices and interfaces 1725. Display controller and display device 1720 provides a visual user interface for the user. I/O devices 1725 allow a user to provide input to, receive output from, and otherwise transfer data to and from the system. I/O devices 1725 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 17.

Data processing system 1700 is an exemplary representation of one or more of the systems detailed described above. Data processing system 1700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1700 may be a network computer, server, or an embedded processing device within another device or consumer electronic product. As used herein, the terms computer, device, system, processing system, processing device, and "apparatus comprising a processing device" may be used interchangeably with data processing system 1700 and include the above-listed exemplary embodiments.

Additional components, not shown, may also be part of data processing system 1700, and, in certain embodiments, fewer components than that shown in FIG. 17 may also be used in data processing system 1700. It will be apparent from this description that aspects of the inventions may be embodied, at least in part, in software. That is, the computer-implemented method(s) detailed herein may be carried out in a computer system or other data processing system 1700 in response to its processor or processing system 1705 executing sequences of instructions contained in a memory, such as memory 1710 or other non-transitory machine-readable storage medium. The software may further be transmitted or received over a network (not shown) via network interface device 1715. In various embodiments, hardwired circuitry may be used in combination with the software instructions to implement the present embodiments. Thus, the techniques are not limited to any specific combination of hardware circuitry and software, or to any particular source for the instructions executed by data processing system 1700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

As detailed herein, some embodiments of a method for . . . include [all of the clauses of the independent method claim]. Additionally, some embodiments of the method further include one or more of: 1) dependent claim 1; 2) dependent claim 2; etc.

As detailed herein, some embodiments of a non-transitory machine-readable medium storing instructions for . . . include [all of the clauses of the independent method claim]. Additionally, some embodiments further include one or more of: 1) dependent claim 1; 2) dependent claim 2; etc.

As detailed herein, some embodiments of an apparatus for . . . include [all of the clauses of the independent method claim]. Additionally, some embodiments of the apparatus further include one or more of: 1) dependent claim 1; 2) dependent claim 2; etc.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   presenting, to a first user of a social network, a user interface for generating media content related to an event, the user interface comprising a plurality of selectable actions;
   receiving, from the first user, a selection of an action of the plurality of selectable actions of the user interface;
   receiving, from the first user using the user interface, first user media content associated with the selected action;
   determining to include the first user media content in an event presentation;
   generating the event presentation comprising the first user media content;

receiving, from the first user, a request to invite a second user of the social network;

presenting, to the second user, the user interface for generating second user media content related to the event, the user interface comprising the plurality of selectable actions;

receiving, from the second user, second user media content associated with a second selected action of the user interface;

determining to include the second user media content in an updated event presentation;

updating the event presentation based on the second user media content, wherein the updated event presentation comprises the first user media content and the second user media content; and transmitting the updated event presentation to a recipient on a date of the event.

2. The computer-implemented method of claim 1, wherein the selectable action of the plurality of selectable actions of the user interface is one of allowing a user to record a media element, upload a media element, input text, and invite another.

3. The computer-implemented method of claim 2, further comprising:
determining the recipient accepts event presentations prior to presenting, to the first user, the user interface for generating media content related to the event.

4. The computer-implemented method of claim 1, further comprising:
identifying privacy settings associated with the recipient; and
determining that the privacy settings allow transmitting the updated event presentation to the recipient.

5. The computer-implemented method of claim 1, further comprising:
identifying an included user in the received first user media content; and
determining a privacy setting of the included user in the first user media content allows the event presentation to display the included user.

6. The computer-implemented method of claim 1, further comprising:
identifying event presentation guidelines for the social network; and
determining the user media content is acceptable to the social network based on the event presentation guidelines.

7. The computer-implemented method of claim 1, further comprising:
receiving a topic selection for the event, wherein receiving the selection of the action of the plurality of selectable actions of the user interface comprises receiving the topic selection for the event.

8. The computer-implemented method of claim 7, wherein the topic is sponsored.

9. A non-transitory computer-readable medium storing instructions which, when executed by one or more processors in a processing device, cause a system to:
present, to a first user of a social network, a user interface for generating media content related to an event, the user interface comprising a plurality of selectable actions;
receive, from the first user, a selection of an action of the plurality of selectable actions of the user interface;
receive, from the first user using the user interface, first user media content associated with the selected action;
determine to include the first user media content in an event presentation;
generate the event presentation comprising the first user media content;
receive, from the first user, a request to invite a second user of the social network;
present, to the second user, the user interface for generating second user media content related to the event, the user interface comprising the plurality of selectable actions;
receive, from the second user, second user media content associated with a second selected action of the user interface;
determine to include the second user media content in an updated event presentation;
update the event presentation based on the second user media content, wherein the updated event presentation comprises the first user media content and the second user media content; and
transmit the updated event presentation to a recipient on a date of the event.

10. The non-transitory computer-readable medium of claim 9, wherein the selectable action of the plurality of selectable actions of the user interface is one of allowing a user to record a media element, upload a media element, input text, or invite another.

11. The non-transitory computer-readable medium of claim 10, further comprising instructions that, when executed by the one or more processors, cause the system to:
determine the recipient accepts event presentations prior to presenting, to the first user, the user interface for generating media content related to the event.

12. The non-transitory computer-readable medium of claim 9, further comprising instructions that, when executed by the one or more processors, cause the system to:
identify privacy settings associated with the recipient; and
determine that the privacy settings allow transmitting the updated event presentation to the recipient.

13. The non-transitory computer-readable medium of claim 9, further comprising instructions that, when executed by the one or more processors, cause the system to:
identify an included user in the first received user media content; and
determine a privacy setting of the included user in the first user media content allows the event presentation to display the included user.

14. The non-transitory computer-readable medium of claim 9, further comprising instructions that, when executed by the one or more processors, cause the system to:
identify event presentation guidelines for the social network; and
determine the user media content is acceptable to the social network based on the event presentation guidelines.

15. The non-transitory computer-readable medium of claim 9, further comprising instructions that, when executed by the one or more processors, cause the system to:
receive a topic selection for the event, wherein receiving the selection of the action of the plurality of selectable actions of the user interface comprises receiving the topic selection for the event.

16. The non-transitory computer-readable medium of claim 15, wherein the topic is sponsored.

17. A system comprising:
one or more processors; and at least one non-transitory computer readable storage medium storing instructions thereon that, when executed by the one or more processors, cause the system to:
  present, to a first user of a social network, a user interface for generating media content related to an event, the user interface comprising a plurality of selectable actions;
  receive, from the first user, a selection of an action of the plurality of selectable actions of the user interface;
  receive, from the first user using the user interface, first user media content associated with the selected action;
  determine to include the first user media content in an event presentation;
  generate the event presentation comprising the first user media content;
  receive, from the first user, a request to invite a second user of the social network;
  present, to the second user, the user interface for generating second user media content related to the event, the user interface comprising the plurality of selectable actions;
  receive, from the second user, second user media content associated with a second selected action of the user interface;
  determine to include the second user media content in an updated event presentation;
  update the event presentation based on the second user media content, wherein the updated event presentation comprises the first user media content and the second user media content; and
  transmit the updated event presentation to a recipient on a date of the event.

18. The system of claim 17, wherein the selectable action of the plurality of selectable actions of the user interface is one of allowing a user to record a media element, upload a media element, input text, or invite another.

19. The system of claim 18, further comprising instructions that, when executed by the one or more processors, cause the system to determine the recipient accepts event presentations prior to presenting, to the first user, the user interface for generating media content related to the event.

20. The system of claim 17 further comprising instructions that, when executed by the one or more processors, cause the system to:
  identify privacy settings associated with the recipient; and
  determine that the privacy settings allow transmitting the updated event presentation to the recipient.

* * * * *